US005790342A

United States Patent [19]
Konishi et al.

[11] Patent Number: 5,790,342
[45] Date of Patent: *Aug. 4, 1998

[54] LOADING POST DRIVING DEVICE HAVING FIRST AND SECOND LOADING RINGS HELD ONLY BY A LOADING RING GUIDE

[75] Inventors: Akio Konishi, Hirakata; Yoshiyuki Saito, Kadoma; Shuzo Takeda, Hirakata; Hideaki Yoshio, Moriguchi; Hiroshi Kurumatani, Osaka, all of Japan

[73] Assignee: Matsushita Electric Industrial Co., Ltd., Osaka, Japan

[*] Notice: The term of this patent shall not extend beyond the expiration date of Pat. No. 5,546,249.

[21] Appl. No.: 536,955

[22] Filed: Sep. 29, 1995

Related U.S. Application Data

[63] Continuation of Ser. No. 251,275, May 31, 1994, Pat. No. 5,546,249, which is a continuation of Ser. No. 867,059, Apr. 10, 1992, Pat. No. 5,365,386.

[30] Foreign Application Priority Data

| Apr. 16, 1991 | [JP] | Japan | 3-083887 |
| Apr. 17, 1991 | [JP] | Japan | 3-085062 |
| Apr. 17, 1991 | [JP] | Japan | 3-085064 |
| Apr. 17, 1991 | [JP] | Japan | 3-085071 |

[51] Int. Cl.⁶ .............................. G11B 15/665
[52] U.S. Cl. .................. 360/95; 360/130.22; 360/85
[58] Field of Search .................. 360/84, 85, 95, 360/130.2, 130.23

[56] References Cited

U.S. PATENT DOCUMENTS

| 4,520,411 | 5/1985 | Ohshima | 360/95 |
| 4,556,922 | 12/1985 | Erhart | 360/95 |
| 4,561,029 | 12/1985 | Maeda | 360/95 |
| 4,991,039 | 2/1991 | Kaku | 360/95 |
| 5,021,899 | 6/1991 | Kotoda | 360/95 |
| 5,124,862 | 6/1992 | Sawano et al. | 360/95 |
| 5,168,399 | 12/1992 | Karo et al. | 360/95 |
| 5,220,469 | 6/1993 | Nagata | 360/95 |
| 5,550,686 | 8/1996 | Matsuoka et al. | 360/85 |

FOREIGN PATENT DOCUMENTS

| 0131413 A1 | 1/1985 | European Pat. Off. . |
| 0329180 A2 | 8/1989 | European Pat. Off. . |
| 0478278 | 1/1992 | European Pat. Off. . |
| 0478278 A2 | 4/1992 | European Pat. Off. . |
| 3020590 | 11/1980 | Germany . |
| 3636681 | 4/1987 | Germany . |
| 1-286166 | 11/1989 | Japan . |

OTHER PUBLICATIONS

Patent Abstracts of Japan, unexamined applications, P field, vol. 14, No. 64, Feb. 6, 1990, The Patent Office Japanese Government, pp. 79.

Primary Examiner—Jefferson Evans
Attorney, Agent, or Firm—Watson Cole Stevens Davis, P.L.L.C.

[57] ABSTRACT

A loading mechanism of a video tape recorder is provided which reduces the thickness of the mechanism for guiding a loading boat along a loading guide. Also, a loading post driving device for a magnetic recording/playback apparatus is provided which can prevent the rotary head cylinder from being damaged or interfered with in its rotation. Furthermore, a loading post holding device which can considerably reduce the height of the device is provided. Additionally, an arrangement of a loading ring guide is provided for loading post driving device to reduce the number of parts used and improve the assembling efficiency of the device.

1 Claim, 19 Drawing Sheets

LOADING POST DRIVING DEVICE HAVING FIRST AND SECOND LOADING RINGS HELD ONLY BY A LOADING RING GUIDE

This is a continuing application of application Ser. No. 08/251,275 filed May 31, 1994 (U.S. Pat. No. 5,546,249), which is a continuing application of Ser. No. 07/867,059 filed Apr. 10, 1992 (U.S. Pat. No. 5,365,386).

BACKGROUND OF THE INVENTION

1. Field of the Invention

The present invention relates to a rotary head type magnetic recording/playback apparatus (hereinafter referred to as a VTR) in which a magnetic tape is wound around a cylindrical rotary head cylinder, having a rotary head built therein, to record/playback a signal by the rotary head. In particular, this invention relates to a loading post driving device for automatically withdrawing a magnetic tape out of a tape cassette having a supply reel and a take-up reel provided therein, and winding the tape around the rotary head cylinder over a predetermined circumferential angle range.

2. Prior Art

Recently, various attempts have been made to reduce the size, weight and height of VTRs. In particular, because the mechanism for loading a magnetic tape in the VTRs has a very complicated arrangement, requires a large number of parts, and considerably affects the size of the VTR as a whole, improving development of the loading mechanism has become a quite important theme.

A conventional loading mechanism will be described below with reference to the drawings. FIG. 15 is a top plan view of a loading post driving device in the prior art. In the drawing, denoted by reference numeral 1 is a tape cassette provided in the front surface thereof with recessed portions 2 and 3 which are disposed in such a manner that a loading post 4 at the supply side (a loading post of the supply side) and an inclined post 5, both mounted on a boat (a movable carrier) 8 at the supply side (a boat of the supply side), are relatively inserted into the recess 2, and a loading post 6 at the take-up side (a loading post of the take-up side) and a tape post 7, both mounted on a boat (a movable carrier) 9 at the take-up side (a take-up side boat 9), are relatively inserted into the recess 3, respectively. The supply side boat 8 and the take-up side boat 9 are connected with a ring 12 at the supply side and a ring 13 at the take-up side, respectively, through relay links 10 and 11 so that, as the rings 12 and 13 rotate, the boats 8 and 9 are guided along a loading guide shot 14 at the supply side and a loading guide slot 15 at the take-up side, respectively. Thereby, a magnetic tape (not shown) is withdrawn from the tape cassette 1 and wound around a rotary head cylinder (not shown).

As shown in FIG. 16, the take-up side boat 9 has a shaft 9a and the shaft 9a extends through the guide slot 15 of a loading guide plate 15a at the take-up side. The supply side boat 8 also engages with the loading guide slot 14 of another loading guide plate in a similar manner.

However, the above conventional arrangement has suffered from such a first problem that the guide plates are necessarily required to retain the boats 8 and 9 in the guide slots 14 and 15, respectively, thus causing limitations in reduction of the area occupied by the loading mechanism and preventing miniaturization of VTRs.

In view of the above, it has also been considered to use loading guide rails instead of conventional guide slots. More specifically, as shown in FIG. 17, an arm 13a extending from a ring 13' of the take-up side is connected with a boat 9' of the take-up side through an engagement portion 13b so that, as the take-up side ring 13' rotates, the take-up side boat 9' is guided along a loading guide rail 15' of the take-upside.

In addition, as shown in FIG. 18, the loading guide rail 15' of the take-up side is provide along the outer circumference thereof with a T-section rail portion 15a projecting upwardly and downwardly at the peripheral edge. The take-up side boat 9' is provided with a hook projection 9a arranged to engage the T-section portion 15a. The take-up side boat 9' is securely held on the T-section portion 15a to be guided along the loading guide rail 15' of the take-up side with rotating of the take-up side ring 13'.

Note that a loading mechanism at the supply side is also arranged in a similar manner and thus will not be explained herein.

According to the above known arrangement, however, because the take-up side boat 9' is only held through the engagement between the T-section portion 15a and the hook projection 9a, ensuring secure holding of the take-up side boat 9' requires extending the amount which the portion 15a projects vertically and increasingly the extent which the T-section portion 15a engages with the hook projection 9a, the leading to difficulties in reducing a height of the loading mechanism.

Next, a loading post driving device previously proposed by the present inventors in Japanese Patent Application No. 2-260796 as an art of reducing the size and weight of a magnetic recording/playback apparatus will be described with reference to the drawings.

FIG. 19 is a schematic top plan view of the loading post driving device and FIG. 20 is a perspective view showing principal parts of the loading post driving device. Note that rotary head cylinder 69 is omitted in FIG. 20 for brevity of the drawing and convenience of the description.

In FIG. 19, 51 denotes a chassis and 57 a tape cassette charged on the chassis 51. A supply reel 53 and a take-up reel 54 are provided in the tape cassette 52. When the tape cassette 52 is charged on the chassis 51, a loading roller post 58 of the supply side and a tension post 59; first and second loading roller posts 60 and 61 of the take-up side; and a pinch roller 62 are positioned inside of a magnetic tape 63 and in recesses 55, 56 and 57 formed on the front edge surface of the tape cassette 52, respectively. Denoted by 64 and 65 are the supply side boat and a take-up side boat on which the loading roller post 58 of the supply side and the first and second loading roller posts 60 and 61 of the take-up side are mounted, respectively. The supply side boat 64 is also provided with an inclined post 66, in addition to the loading roller post 58 of the supply side, the inclined post 66 existing within the recess 55 together with the loading roller post 58 of the supply side. Denoted by 67 and 68 are an arc shape loading guide of the supply side and another arc shape loading guide of the take-up side disposed along the circumference of a rotary head cylinder 69 as shown in FIG. 20. The guides 67 and 68 operate to guide the supply side boat 64 and the take-up side boat 65 during the operation of loading the magnetic tape 63, respectively. Also as shown in FIG. 20, the supply side loading guide 67 is arranged such that an end side of the guide 67 along which the boat 64 returnably moves is raised higher than a proximate end side of the guide 67 which is a home position of the boat 64. On the other hand, the take-up side loading guide 68 is arranged such that an end side of the guide 68 along which the boat 65 returnably moves is lowered than a proximate end side of the guide 68 which is a home position of the boat 65.

The supply side boat 64 is driven by a ring 85 of the supply side having an arm 86 on which a distal end portion of drive shaft 76 of the supply side is mounted. As will be seen from FIG. 20, the supply side boat 64 is arranged to be vertically movable along the drive shaft 76 through a hold 78 of the boat 64. The rotary head cylinder 69 is attached substantially vertically with respect to the chassis 51. When the supply side boat 64 is moved along the supply side loading guide 67, the supply side loading roller post 58 winds the magnetic tape 63, withdrawn out of the supply reel 53, around the rotary head cylinder 69 in a direction extending obliquely upwardly along a left side surface area of the cylinder 69. When the take-up side boat 65 is moved along the take-up side loading guide 68, the take-up side loading roller post 60 winds the magnetic tape 63 withdrawn out of the take-up reel 54 around the rotary head cylinder 69 is a direction extending obliquely downwards along a right side surface of the cylinder 69.

Denoted by 70 is a capstan provided on the chassis 51 outside a location where the tape cassette 52 is to be charged, the capstan 70 being supported at its upper and lower ends by bearings 71, and attached to the chassis 51 such that it is inclined relative to the chassis at an angle substantially equal to those of the take-up side loading roller posts 60 and 61 at the loading terminal position. The inclined capstan 70 is brought into full contact with the magnetic tape 13 over its entire width which is introduced obliquely upwardly from the take-up side loading roller post 61 along a sloped path and is inclined forwardly. During completion of the tape loading operation, the capstan 70 is in press-contact with the pinch roller 62 which is moved from the position of the recess 57 of the tape cassette 52 so that the magnetic tape 63 is held between the capstan 70 and the pinch roller 62 to be driven. Incidentally, the pinch roller 62 is arranged to have the same inclination angle as that of the capstan 70 in order to be in full contact with the capstan 70 over the entire width of the tape. Denoted by 72 is an audio-control head provided at a location in the vicinity of the capstan 70 between the take-up side second loading roller post 71 at the loading terminal position and the capstan 70. The audio-control head 72 is attached to the chassis 51 in such a manner than it is inclined at the same angle as that of the capstan 70 in order to facilitate contact between the audio-control head 72 and the magnetic tape 63, which is inclined forwards and introduced obliquely upwards along the sloped path from the take-up side second loading roller post 61 to the capstan 70. Denoted by 73 is an auxiliary roller post which moves in interlock with the pinch roller 12 such that it is relatively positioned in the recess 57 of the tape cassette 52 before starting the tape loading operation, and it moves together with the pinch roller 62 during completion of the tape loading operation, thereby guiding the magnetic tape 63 travelling between the capstan 70 and the pinch roller 62 to lead to a fixed inclined post 74. As regards the magnetic tape 63 fed from the take-up side second loading roller post 61 through the capstan 70 and the auxiliary roller post 73 while maintaining the forwardly-inclined posture, torsion of the magnetic tape 63, generated when the tape travelling is converted from the sloped path into a horizontally running path, is corrected by the inclined fixed post 74 which is slantingly attached to the chassis 51 before the magnetic tape 63 reaches the tape cassette 52, and is then wound around the take-up reel 54 of the tape cassette 52.

In the loading post driving device, as shown in FIG. 20, the boats 64 and 65 are provided with holes 78 and 79 through which the boats 64 and 65 are engaged with drive shafts 76 and 77, respectively. For smooth movement of the boats 64 and 65 in the vertical and lateral directions, the holes 78 and 79 are formed to be somewhat larger than diameters of the drive shafts 76 and 77. Therefore, the loading post becomes so unstable in positioning that is may incline undesirably. As means for preventing such an inclination, it is possible to provide a projection 80 on the take-up side boat 65 to support the drive shaft 77 over a larger height range, thereby increasing stability of the loading post 61, as illustrated in FIG. 20.

With regard to the supply side boat 64, however, since the inclined post 66 is slanted toward a location above the hole 78, it is impossible to provide as long a projection extending upwards as in the take-up side boat 65. In addition, because of the supply side loading post 58 being at a higher level relative to the drive shaft 76 at the loading terminal position, even if a short projection is provided on the boat 64, the drive shaft 76 could not engage with the projection, resulting in that the stability could not be enhanced and the loading post may incline toward the rotary head cylinder 69 as indicated by an arrow A in FIG. 20.

Thus, the above conventional arrangement has suffered from such a second problem to be solved that when the unstable unloading post inclines toward the rotary head cylinder, it may damage the rotary head cylinder or interfere with rotation thereof by possible contact between the two members.

A conventional loading post holding device will be next described with reference to the drawings.

FIG. 21 is an enlarged view, partly cross-sectioned, as viewed in a direction of arrows XXI—XXI in FIG. 20. In FIG. 21, 117 denotes a roller holder member for holding the roller or post 61 through which a shaft 116 is inserted. 118 denotes a pipe press-fitted to the take-up boat 65 with the end portion of the shaft 116 inserted into the pipe 118.

FIG. 22 is a view of a part of FIG. 21, partly cross-sectioned, as viewed in a direction of arrows XXII—XXII in FIG. 21. In FIG. 22, the shaft 116 is pressed against one side of the inner peripheral surface (a reference surface n) of the pipe 118 by the distal end of a screw 119 which is screwed into a threaded hole 120 provided at one end of the take-up side boat 65, so that the shaft 116 will not rotate. In order to surely press-fix the shaft 116 against the reference surface n by the distal end of the screw 119, the pipe 118 is extended downwards below the underside of the take-up side boat 65 to such a dimension h that a certain length of the shaft is left or protruded below the point where the shaft is pressed.

The operation of the conventional loading post holding device thus arranged will be explained below.

First, in an initial state where a tape cassette (not shown) is charged, the supply side boat 64 is on standby at its initial position (or hole position) and the take-up side boat 65 is on standby while being supported on a rest 68a, as indicated by phantom lines in FIG. 20. When a manual playback button (not shown) is pushed in that state, power is transmitted to the ring gear 85 by a drive means (not shown) so that, on the supply side, the supply side boat 64 is driven in a direction of an arrow b by the supply side drive shaft 76 (see FIG. 20). Likewise, on the take-up side, the take-up side boat 65 is driven in a direction of an arrow a through the take-up side drive shaft 77. When an operation of loading a magnetic tape of completed, the supply side boat 64 and the take-up side boat 65 move to respective positions indicated by solid lines where a projection 64a of the supply side boat 64 is in abutment against a lug 67a and a projection 65a of the take-up side boat 65 is in abutment against a lug 68a.

However, the above loading post holding device in the prior art has suffered from such a third problem that in order to reduce a thickness in a direction of height of magnetic recording/playback apparatus, the thickness of the take-up side boat 65 must be reduced because of the take-up side loading guide 68 being inclined obliquely downwards, but the take-up side boat 65 requires a certain extent of thickness for providing the threaded hole 120 into which the screw 119 is screwed to positively press-fix the sheet 116 against the reference surface n. In addition, positive press-fixing of the shaft 116 against the reference surface n also requires the pipe 118 to extend downwards below the take-up side boat 65 by the dimension h, making it difficult to considerably reduce the total height of the loading post holding device.

Furthermore, in a loading post driving device of conventional magnetic recording/playback apparatus, means for turnably holding a loading ring to drive a loading post is generally arranged by providing shafts at several locations and holding the loading ring between a plurality of rollers mounted on each of the shaft.

Such an arrangement will be explained below with reference to the drawings.

FIG. 23 shows a top plan view of a VTR body. Denoted by 121 is a cassette having a supply reel 122 and a take-up reel 123 both provided therein. Between the supply reel 122 and the take-up reel 123, a magnetic tape 124 is stretched through guide posts 125a, 125b and 126.

The cassette 121 is rested on a base plate 130 at a predetermined position, the supply reel 122 in the cassette 121 is fitted over a supply reel stand 131, and further the take-up reel 123 is fitted over a take-up reel stand 132. 182 denotes an eraser head, 183 a control head, 184 a motor for a capstan and so forth, 185 a capstan, 186 an idler, and 188 a plunger. I and II denote a pair of magnetic tape withdrawer units for withdrawing the magnetic tape 124 out of the cassette 121 and winding the same along the circumference of a rotary head cylinder 133 provided in an inclined position.

The description concerning an arrangement of the withdrawer unit I is given below.

FIG. 24 is a cross-sectional view of the withdrawer unit I.

In FIG. 24, 133 denotes a rotary head cylinder around which the magnetic taper 124 is to be wound, and 156 and 157 are loading rings having gears 159 and 160 formed along the outer peripheral edges thereof and disposed on the underside of the base plate 130, one above the other in a concentric relationship. The loading rings 156 and 157 are held in place by three pairs of rollers 158 such as 158a, 158b; 158c, 158d; and 158e, 158f respectively fitted over roller pins or shafts 161a, 161b and 161c extending downwards from the base plate 130 in such a manner as to be able to turn in directions opposite to each other. 140 denotes a loading post provided on a withdrawer unit base 134 which engages with the magnetic tape 124 to withdraw the magnetic tape 124 out of the cassette 121 and, after completion of a tape withdrawing operation, to serve as one guide post for defining a running path of the magnetic tape. 141 denotes a correction post base on which a correction post 142 is mounted with an inclination of a predetermined angle θ.

Denoted by 139 is a guide slot for guiding sliding movement of the withdrawer unit which withdraws the magnetic tape 124 out of the cassette 121 and winds the same along the circumference of the rotary head cylinder 133 provided in an inclined position.

A stopper 145 is fixed onto the base plate 130 by a screw 150 with a shaft 149 serving as a guide. Since an attachment hole 151 has an elongated shape, the stopper 145 is turnable about the shaft 149 to some extent in directions of arrows Y-Y'.

The withdrawer unit II is symmetrical to the withdrawer unit I and thus will not be described herein.

The operation of the loading post driving device thus arranged will be explained below.

When a playback button (not shown) is pushed, a loading motor (not shown) starts rotating, whereupon a spur gear (not shown) is rotated through a worm gear (not shown) connected with a loading motor, thereby rotating the loading ring 156 held in mesh with the spur gear.

The withdrawer unit base 134 engaging with the loading ring 156 slides along the guide slot 139 in a direction of an arrow X, whereas a withdrawer unit base 134' slides along a guide slot 139' in a direction of an arrow Y. At this time, the magnetic taper 124 exits the cassette 121 and is kept in engagement with the loading posts 140 and 140' and the correction posts 141 and 141'. The loading posts 140 and 140' move along the circumference of the rotary head cylinder 133 and come into engagement with V-shaped grooves 146 and 146' which serve as stopper portions of the stoppers 145 and 145', respectively.

Under the condition that the loading posts 140 and 140' abut against the V-shaped grooves 146 and 146' of the respective stoppers, the loading motor (not shown) stops its rotation and the loading posts 140 and 140' remain stopped there without returning backward.

Then, a plunger 188 is actuated to make an idler 186 abut against a capstan 185 for running the magnetic tape 124.

Additionally, when a stop button (not shown) is pushed, the device comes into an unloading state where the loading posts 140 and 140' are returned to their original positions.

However, the above conventional arrangement has suffered from such a fourth problem that since the means for holding the loading rings 156 and 157 in a turnable manner is constituted by providing the roller pins at several locations and holding the loading rings one above the other by the rollers fitted over the roller pins serving as shafts, not only the number of parts used is increased but also the number of assembling steps.

SUMMARY OF THE INVENTION

According to a first aspect, the present invention is directed to solve the aforementioned first problem, and its object is to provide a loading post driving device which is compact and thin.

In light of the above object, according to a first feature of the loading post driving device of the present invention, a boat on which a loading post is mounted in extending upwards has a hold through which a drive shaft is inserted, and has an engagement portion engaging with a stepped portion provided along one side edge of the loading guide.

With the above arrangement, the boat on which the loading post is mounted can be surely held on the loading guide through the engagement portion. Further, the drive shaft inserted through the hole in the boat enables more positive holding of the boat on the loading guide.

According to a second aspect, the present invention is directed to solve the aforementioned second problem, and its object is to provide a loading post driving device with high reliability which can prevent a rotary head cylinder from being damaged or interfered with in its rotation, while maintaining the feature of being compact and light as in the conventional magnetic recording/playback apparatuses.

In light of the second object, according to a second feature of the loading post driving device of the present invention, press means for pressing the drive shaft in one direction is provided on the loading boat to keep the upper end of the holding post apart from the rotary head cylinder.

With the above arrangement, the direction of inclination (a tendency of inclining) of the loading post is limited to a direction in which the loading post moves away from the rotary drum cylinder. Thus, the upper end of the holding post can be always kept in a state apart from the rotary head cylinder so that the holding post will not contact with the rotary head cylinder.

According to a third aspect, the present invention is directed to solve the aforementioned third problem, and its object is to provide a loading post holding device which can be considerably reduced in the height.

In light of the third object, according to a third feature of the present invention, the loading post holding device comprises a shaft, a rotatable roller into the center of which the shaft is inserted, a boat movable along a loading guide between a first position and a second position, a pipe having a hole to receive the shaft inserted through the pipe and being fixed to a part of the boat, a roller holder tube for holding the shaft press-fitted (or tightly fitted) in the roller holder tube at the upper end portion, having a flange at the lower end and being screwed at the lower portion with the upper end portion of the pipe, and an urging member fixed to the boat, wherein the urging member always presses the peripheral edge of the flange toward the shaft so that the shaft is pressed against the inner peripheral surface of the pipe at one side.

With the above arrangement, since a point at which the shaft is actually pressed is given by the contact position between the urging member and the flange so as to increase a level of the pressing point, and a screw for pressing the shaft becomes unnecessary, the size of the pipe and the take-up side boat in a direction of height can be reduced. It is thus possible to suppress the total height of the loading post holding device to be as low as possible.

According to a fourth aspect, the present invention is directed to solve the aforementioned fourth problem, and its object is to provide a guide arrangement for loading rings in a loading post driving device which can reduce the number of parts used and improve the assembling efficiency.

In light of the fourth object, according to a fourth feature of the loading post driving device, a loading ring guide is fabricated through one-piece molding and provided with holders adapted to integrally hold the loading rings and the loading guide in a turnable manner.

With the loading post driving device thus arranged, the number of parts used can be reduced by fabricating a loading ring guide through one-piece molding, and the assembling efficiency is improved by providing holders on the loading ring guide so as to integrally hold the loading rings and the loading guide in a turnable manner.

DETAILED DESCRIPTION OF THE PREFERRED EMBODIMENTS

A first embodiment of the invention will be described hereinafter with reference to the drawings.

Figure 1:
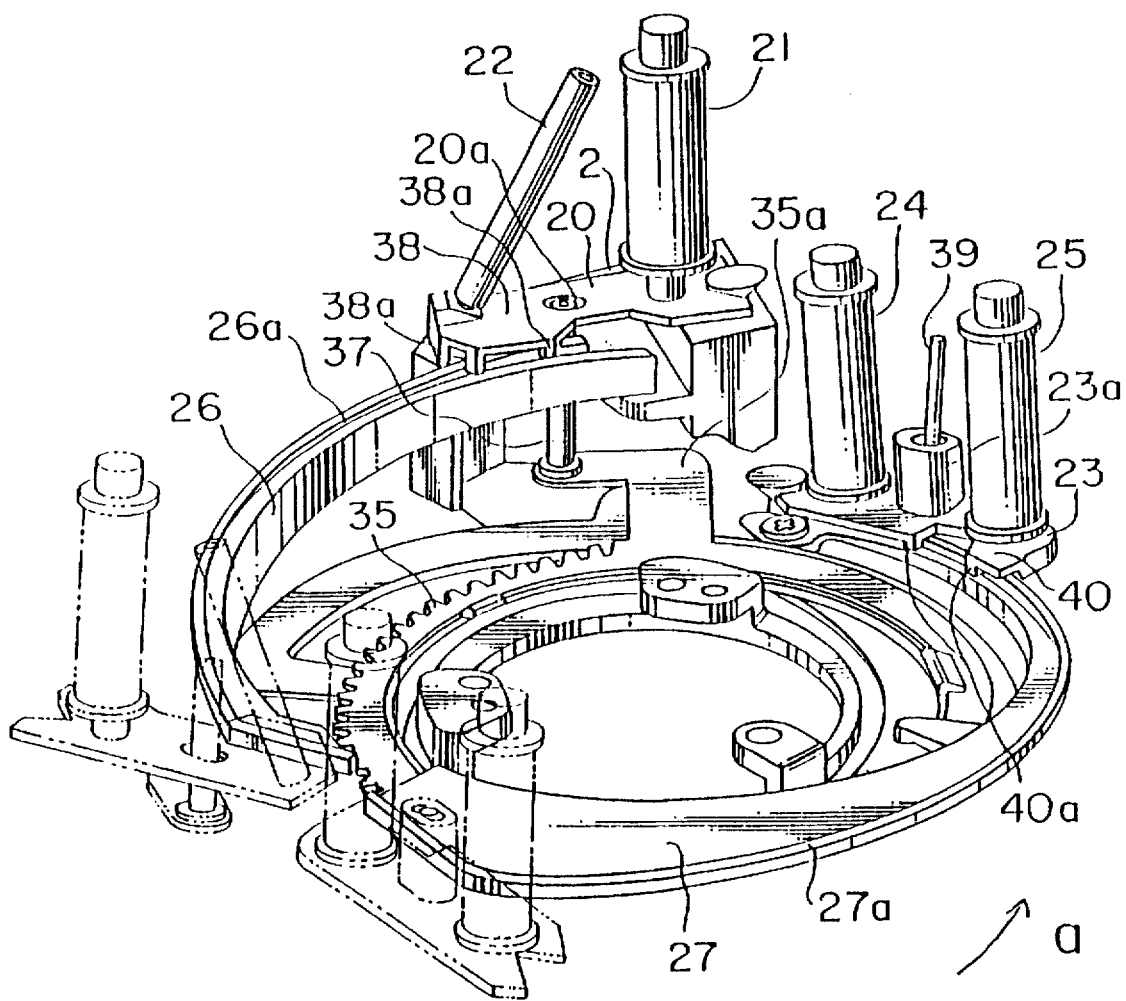
FIG. 1 is a perspective view of principal parts showing a first embodiment of a loading post driving device of the invention.

FIG. 1 is a perspective view showing principal parts of a loading post driving device according to the first embodiment.

Figure 2:
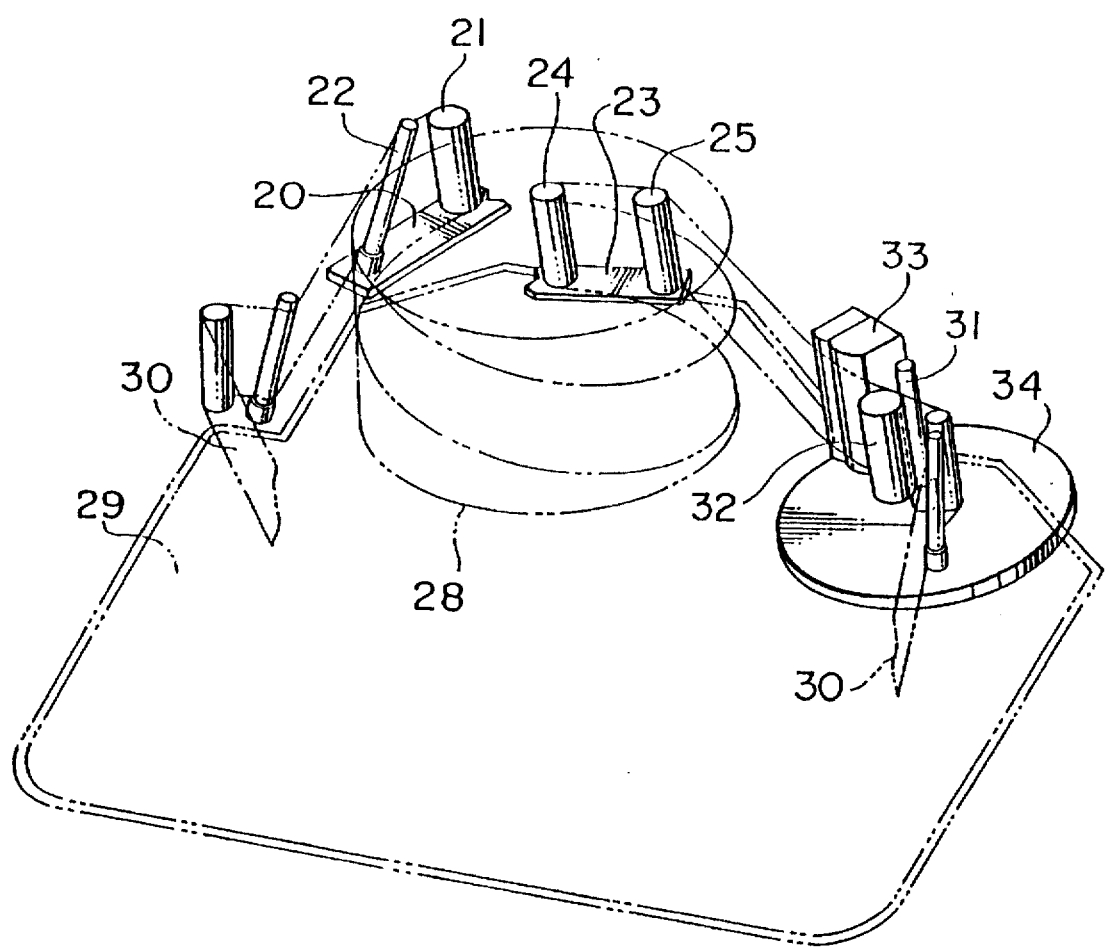
FIG. 2 is a perspective view illustrating a schematic arrangement of the first embodiment.

In FIG. 1, denoted by 20 is a boat, at the supply side, on which a loading roller post 21 at the supply side and an inclined post 22 are mounted in a position of extending upwards, whereas 23 denotes a boat at the take-up side on which first and second loading rollers posts 24 and 25 at the take-up side are mounted in a position of extending upwards. 26, 27 denote an arc shaped loading guide at the supply side and an arc shape loading guide at the take-up side both disposed along the circumference of a rotary head cylinder 28 (see FIG. 2). The guides 26 and 27 operate to guide the supply side boat 20 and the take-up side boat 23, respectively. The supply side loading guide 26 is arranged in such a manner that an end side of the guide 26 along which the boat 20 returnably moves is raised higher than a proximate end side of the guide 26 which is a home position of the boat 20. At an end position, an operation of loading a magnetic tape is completed, i.e., the loading terminal position. The take-up side loading guide 27 is arranged in such a manner that an end side of the guide 68 along which the boat 23 returnably moves is lower than a proximate end side of the guide 68 which is a home position of the boat 23.

The rotary head cylinder 28 is attached substantially vertically with respect to a chassis 29. As shown in FIG. 2, when the supply side boat 20 moves along the supply side loading guide 26, the supply side loading roller post 21 winds a magnetic tape 30 withdrawn out of a supply reel (not shown) around the rotary head cylinder 28 in a direction extending obliquely upwards toward the left side. On the other hand, when the take-up side boat 23 is moved along the take-up side loading guide 27, the take-up side first loading roller post 24 winds the magnetic tape 30 withdrawn out of a take-up reel (not shown) around the rotary head cylinder 28 in a direction extending obliquely downwards toward the right side.

Denoted by 31 is a capstan provided on the chassis 29 such that it is inclined relative to the chassis at an angle substantially equal to those of the take-up side first and second loading roller posts 24 and 25 at the loading terminal position. The inclined capstan 31 is brought into full contact with the magnetic tape 30 over its entire width which is introduced obliquely upwardly from the take-up side second loading roller post 45 and in inclined forwards. Thus, the magnetic tape 30 is fed while being held between the capstan 20 and a pinch roller 32 which has an inclination at the same angle as that of the capstan 31.

Denoted by 33 is an audio-control head disposed on the chassis 29 in such a manner that it is inclined at the same angle as that of the capstan 31 in order to make full contact with the magnetic tape 30 over its entire width which is inclined forwards.

Denoted by 34 is a capstan motor for driving the capstan 31 which is also inclinedly attached to the chassis 29. With such an arrangement, the capstan 31 is not required to extend below the bottom of a tape cassette (not shown) at its charged position, unlike the prior art, makes it possible to reduce a thickness of the chassis 29 and thus facilitate reduction of the device thickness.

Denoted by 35 is a ring at the supply side for driving the supply side boat 20, and a fixed arm 35a at the supply side is extended from a part of the ring 15 with a drive shaft 37 of the supply side mounted in a position of extending upwards at the distal end portion of the arm 35a. As will be seen from FIG. 1, the supply side boat 20 is arranged to be vertically movable through a hole 20a at the supply side, and it also includes at its rear end a holder portion 38 at the supply side engaging with a stepped portion (or rib) 26a provided on the top of the supply side loading guide 26 along the outer periphery (or side edge) of the guide 26 with an arc shape. The supply side holder portion 38 has a pair of claws 38a engaging with the stepped portion 26a. Thus, the supply side boat 20 is guided along the supply side loading guide 26 while being positively held without departing from the guide 26.

Likewise, the take-up side boat 23 is arranged to be vertically movable with a drive shaft 39 of the take-up side inserted through a substantially cylindrical portion 23a of the boat 23, and it also includes at its rear end a holder portion 40 of the boat 23 engaging with a stepped portion (or rib) 27a provided on the top of the take-up side loading guide 27 along the outer periphery (or side edge) of the guide 27. The take-up side holder portion 40 has a pair of claws 38a engaging with the stepped portion 27a. Thus, the take-up side boat 23 is guided along the take-up side loading guide 27 while being positively held without departing from the guide 27.

Figure 3:
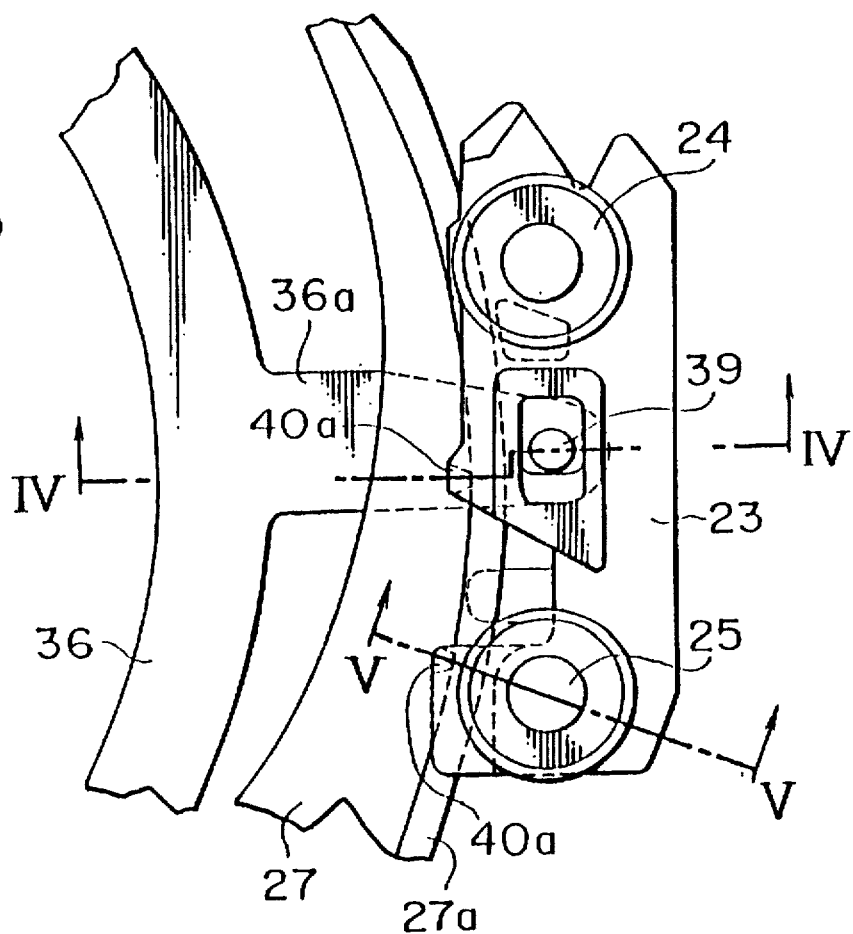
FIG. 3 is a top plan view showing a section of the first embodiment.

For more clarity, the above arrangement of the loading post driving device will now be explained with reference to FIGS. 3 to 5. FIG. 3 is a top plan view of illustrating the relationship between the take-up side boat and the take-up side loading guide, and FIGS. 4 and 5 are cross-sectional views taken along lines IV—IV and V—V in FIG. 3, respectively.

In these drawings, 36 denotes a take-up side ring for driving the take-up side boat 23, and an arm 36a is extended from a part of the ring 36 with a drive shaft 39 at the take-up side mounted in a position of extending upwards at the distal end portion of the arm 36a.

Figure 4:
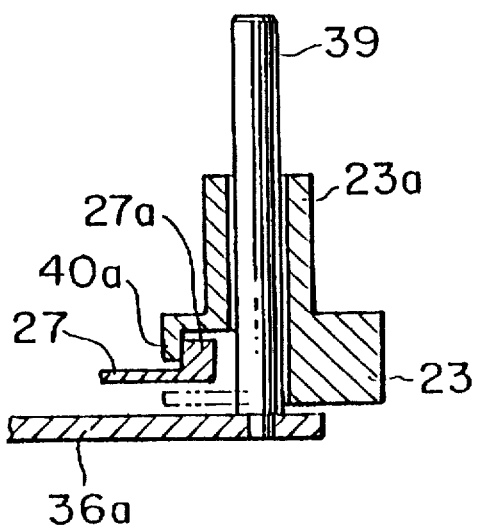
FIG. 4 is a cross-sectional view taken along a line IV—IV in FIG. 3.
Figure 5:
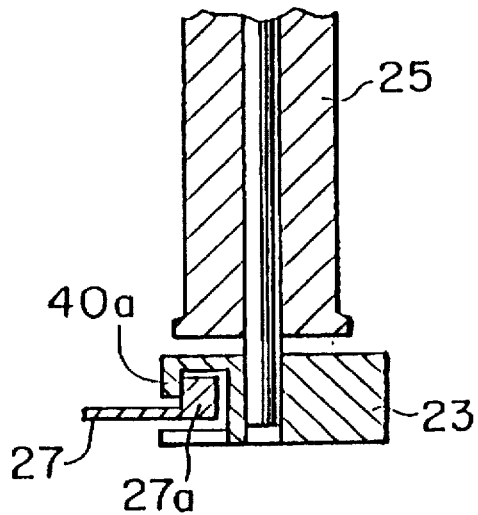
FIG. 5 is a cross-sectional view taken along a line V—V in FIG. 3.
Figure 18:
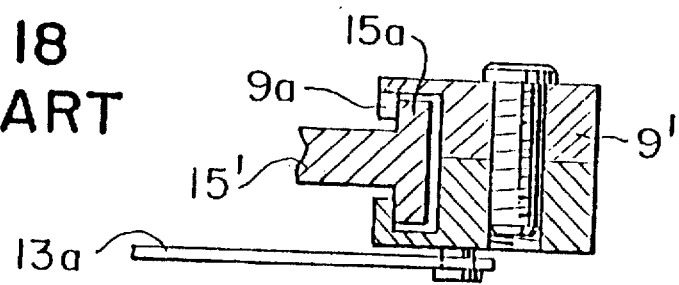
FIG. 18 is a cross-sectional view taken along a line XVII—XVII in FIG. 17.
Figure 19:
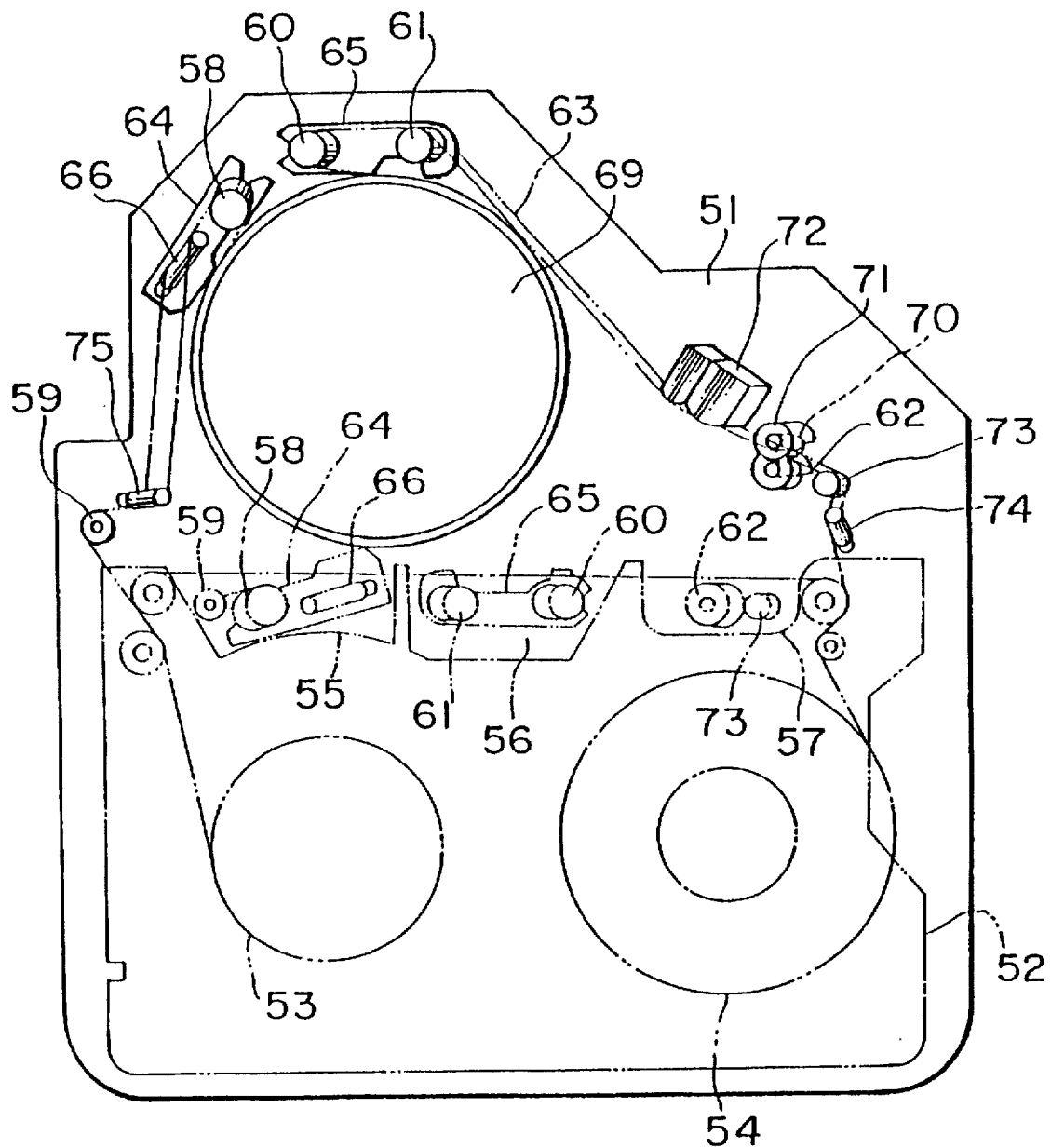
FIG. 19 is a schematic top plan view of the loading post driving device in the prior art.

As will be seen from FIGS. 4 and 5, the take-up side boat 23 is held through the engagement between the take-up side stepped portion 27a of the take-up side loading guide 27 and the take-up side claws 40a of the take-up side boat 23. With such an arrangement alone, however, the take-up side boat 23 cannot be held so sufficiently as the prior art using a T-section guide rail shown in FIG. 18. In other words, because the take-up side boat 23 may turn about the take-up side claws 40a, it cannot be held in place with certainty. In view of that, by arranging the take-up side drive shaft 39 provided on the take-up side ring 36 to be inserted through a hollow space of the take-up side substantially cylindrical portion 23a on the take-up side boat 23, the take-up side boat 23 is prevented from turning, so that it is positively held on the take-up side loading guide 27.

This makes it possible to surely hold the take-up side boat 23 without the need of establishing a sufficient degree of engagement between the take-up side stepped portion 27a and the take-up side claws 40a, and thus remarkably reduce the device height.

Additionally, by increasing a height of the take-up side substantially cylindrical portion 23a, play produced between the take-up side drive shaft 39 and the take-up side substantially cylindrical portion 23a is reduced to enable more positive holding of the take-up side boat 23.

Note that the supply side boat 20 is arranged in a similar manner and thus will not be described herein.

As will be apparent from the above, according to the first embodiment of the present invention, since a drive shaft is utilized as not only means for simply transmitting driving force to a loading boat, but also means for surely holding a loading guide on the loading boat, the loading boat can be guided along the loading guide in a more reliable and stable manner.

Further, since a sufficient degree of holding force can be obtained even if the engagement between a stepped portion of the loading guide and an engaging portion of the loading boat is made less in its extent, it is possible to remarkably reduce a thickness of the loading mechanism.

Next, a second embodiment of the invention will be described with reference to FIGS. 6 to 9. Note that the same components in this embodiment as those in the prior art are denoted by the same reference numerals and the description concerning those components is omitted.

Figure 6:
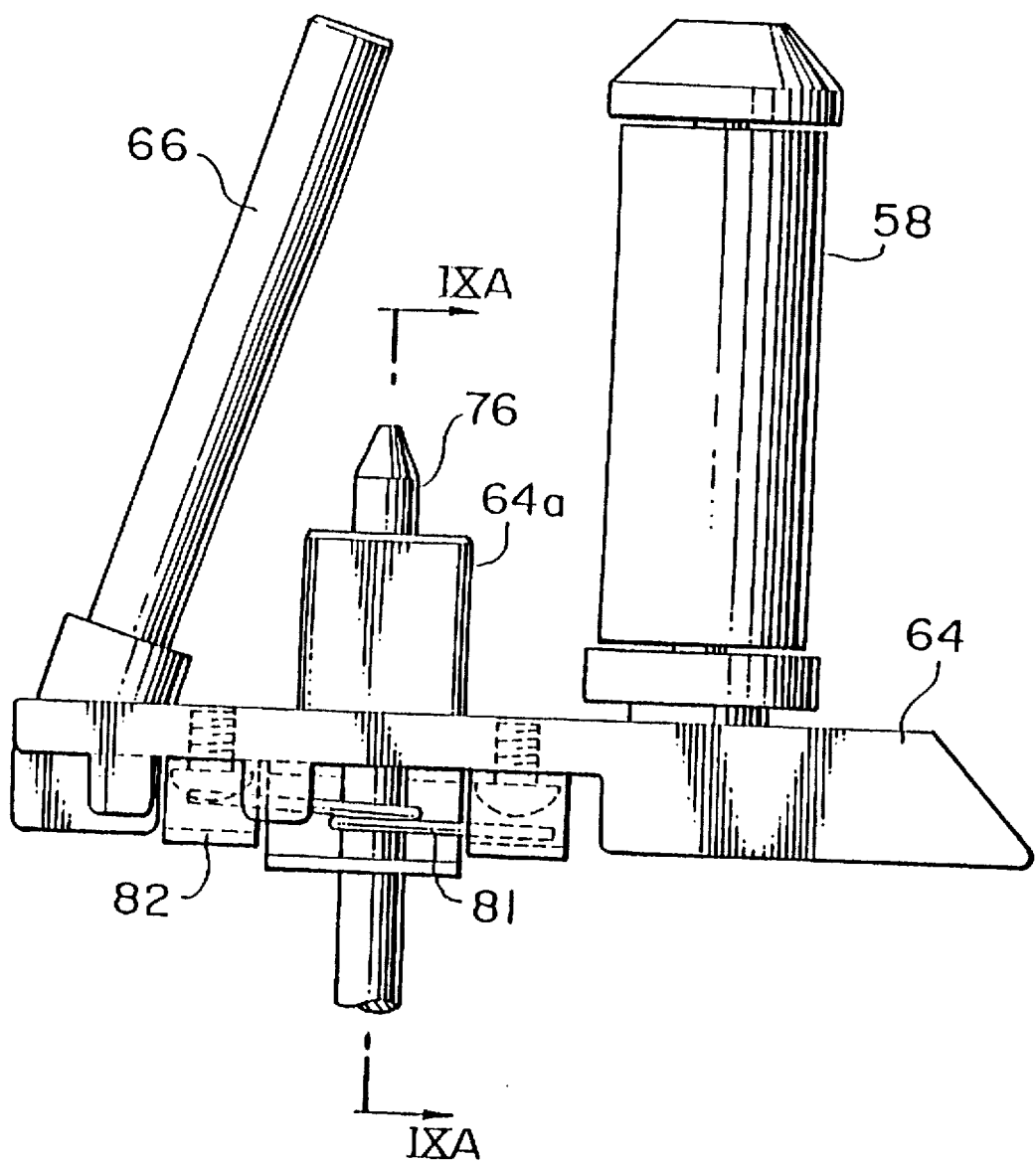
FIG. 6 is an enlarged partial view according to a second embodiment of the loading post driving device of the invention.

FIG. 6 is an enlarged view showing principal parts of a loading post driving device in a magnetic recording/playback apparatus according to the second embodiment of the invention. FIG. 6 shows a state where a boat 64 of the supply side is engaged with a drive shaft 76. This example is different from the prior art in that a coil spring 81 is provided under the supply side boat 64. 82 denotes a fixture also provided below the supply side boat 64 for retaining the coil spring 81. Further, 64a is a projection formed on the top surface of the supply side boat 64. Since an inclined post 64 is slanting toward a location above the projection 64a, the projection cannot be so increased in its height.

Figure 7:
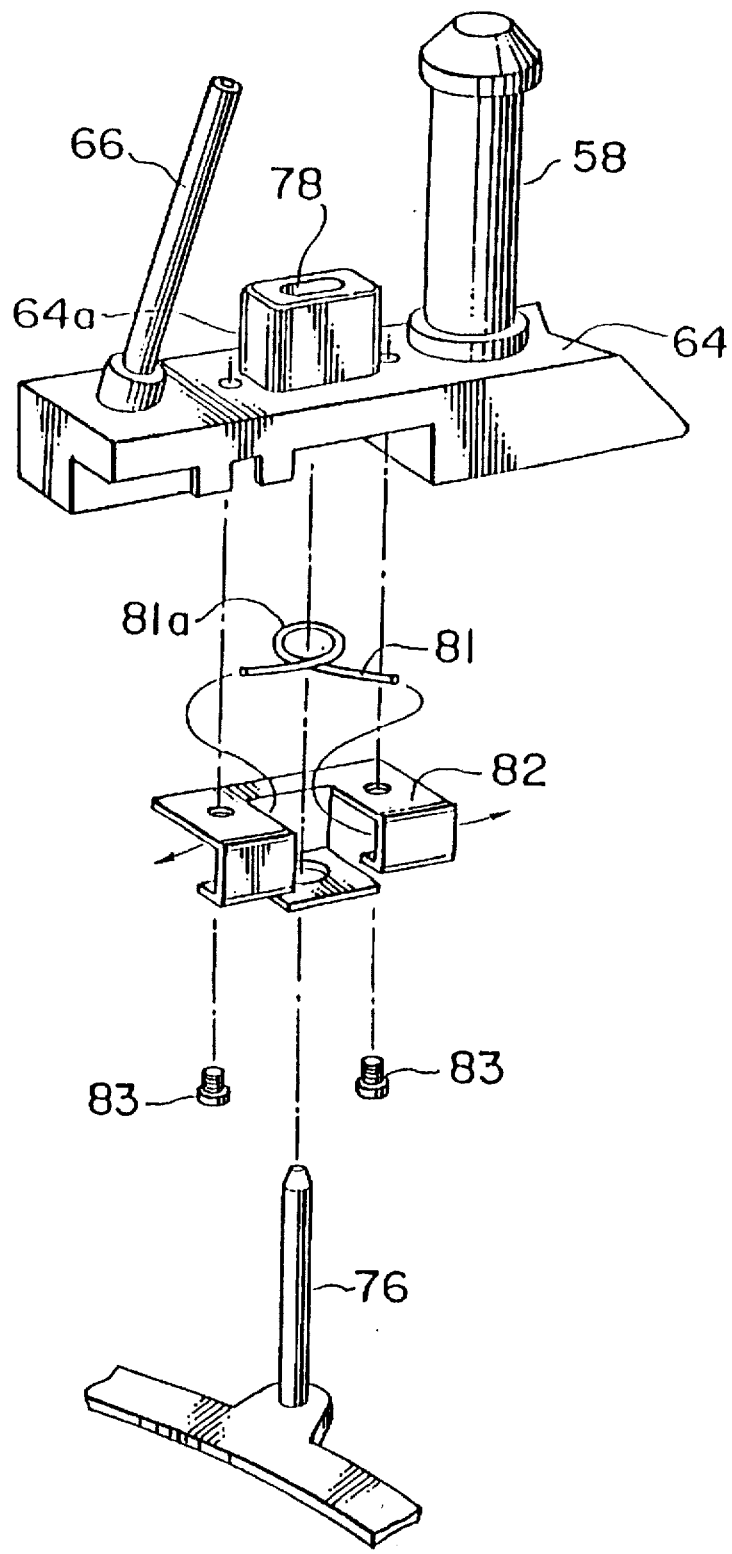
FIG. 7 is a breakdown perspective view of the loading post driving device of FIG. 6.

FIG. 7 is a breakdown perspective view of the loading post driving device shown in FIG. 6. The coil spring 81 is attached to the fixture 82 which is in turn fixed by screws 83 to the underside of the supply side boat 64. The supply side drive shaft 26 is assembled by being inserted through both a ring portion 81a of the coil spring 81 and a hole 78 of the projection 64a on the supply side boat 64.

Figure 8A:
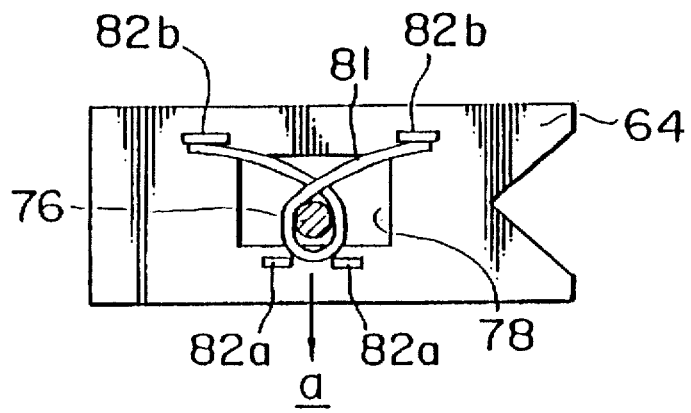
FIG. 8A is a bottom view of a loading boat at the supply side in the second embodiment.
Figure 8B:
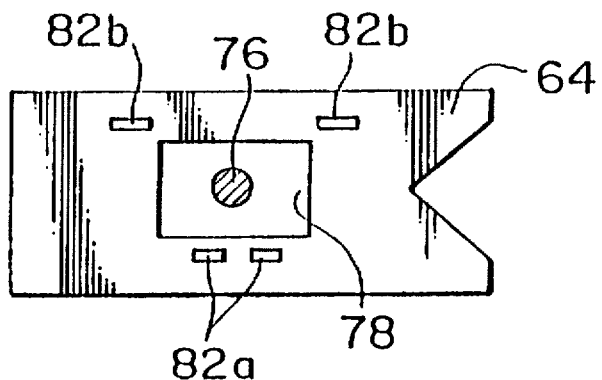
FIG. 8B shows a state where a coil spring is removed away from the loading boat at the supply side.
Figure 8C:
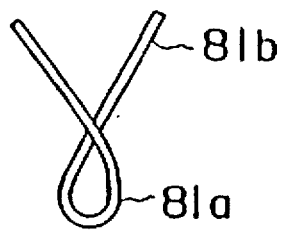
FIG. 8C shows the coil spring.

FIGS. 8A to 8C are views illustrating an operation of the coil spring 81 provided on the supply side boat 64. For the sake of brevity, the fixture 82 is shown in the simplified form by illustrating only its claws 82a and 82b.

FIG. 8A shows the supply side boat 64 as viewed from the backside. As seen from the drawing, the coil spring 81 is retained at both ends by the claws 82a and 82b. FIGS. 8B and 8C show the supply side boat 64 and the coil spring 81, respectively, which are disassembled from the state of FIG. 8A. As seen from FIG. 8C, in a normal state, free end sections 81b of the coil spring 81 are not so bent with respect to the ring portion 81a. Therefore, when the coil spring 81 is attached to the supply side boat 64 such that the free end sections 81b are retained in a bent state by the claws 82a and 82b as shown in FIG. 8A, an urging force in a direction of an arrow a in FIG. 8A is applied to the ring portion 81a of the coil spring 81. Thus, the urging force in the direction of the arrow a is also applied to the drive shaft 76.

Figure 9A:
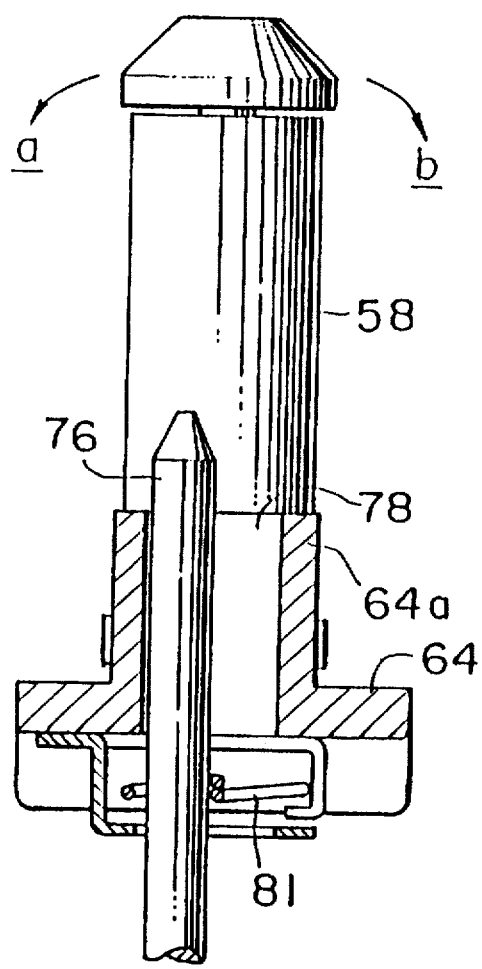
FIG. 9A is a view showing the relationship between a loading post and a drive shaft in the second embodiment.
Figure 9B:
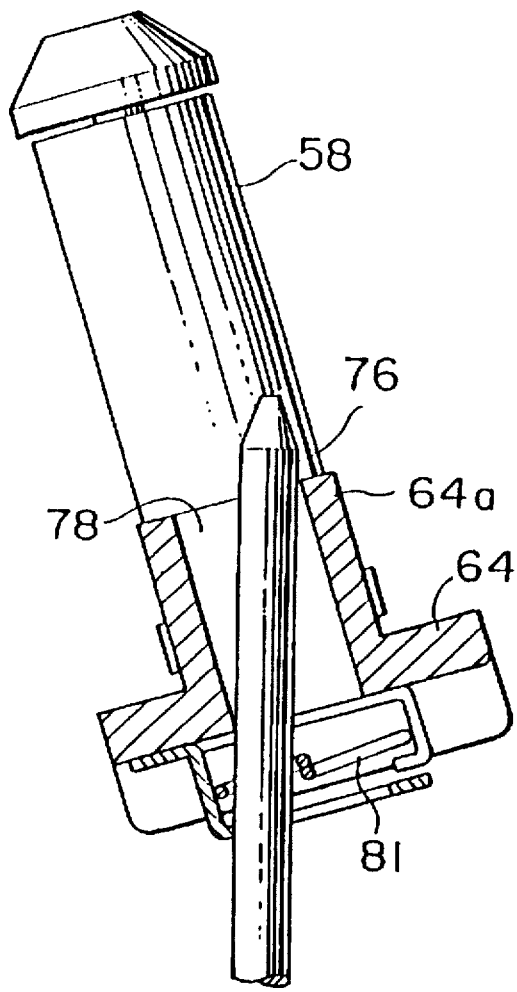
FIG. 9B is a view showing an operation state in the second embodiment.

FIGS. 9A and 9B are cross-sectional views taken along a line IXA—IXA in FIG. 6, showing the relationship between a loading post and the drive shaft 76 resulting from the coil spring 81 pressing the drive shaft 76. Since the coil spring 81 provided on the underside of the supply side boat 64 presses the drive shaft 76 aside as explained above, the drive shaft 76 is always in a state biased to one side in the hole 78 as shown in FIG. 9A. In this state, the drive shaft 76 is fixed vertically relative to the chassis at all times. Accordingly, even when the loading post, such as loading post 58 of the supply side, is inclined relative to the drive shaft 76, it can incline in a direction of an arrow a in FIG. 9A to come into a state as shown in FIG. 9B, but can never incline in a direction of an arrow b. This is because the drive shaft 76 is positioned by the coil spring 81 against one lower end of the hole 78.

Thus, by arranging the rotary head cylinder on the side indicated by the arrow b in FIG. 9A, the loading post can be prevented from contacting with the rotary head cylinder.

Stated otherwise, an inclination of the loading post can be limited to only one direction by providing the coil spring on the underside of the supply side boat, and the loading post can be prevented from damaging the rotary head cylinder or interfering with its rotation by allowing the loading post to incline away from the rotary head cylinder. As a result, the loading post driving device with high reliability can be provided.

While the coil spring is provided on the supply side boat in this example, the present invention is not particularly limited to such an arrangement. For instance, the coil spring may be provided on only the take-up side boat or on both of the supply side and take-up side boats.

Also, while pressing means is provided on the under-side of the supply side boat in this example, the present invention is not particularly limited to such an arrangement. For instance, the pressing means may be provided on the upper side of the supply side boat. In this case, however, a direction of pressing the drive shaft must be opposite to that in the above embodiment to obtain a similar effect.

Further, while the coil spring is used as pressing means in this example, the invention is not particularly limited to such an arrangement. For instance, a leaf spring may be used instead.

As set forth above, according to the second embodiment of the present invention, since a loading boat is provided with pressing means to press a drive shaft, the upper end of a loading post can be always kept apart from a rotary head cylinder. It is thus possible to provide a loading post driving device which can prevent the loading post from damaging the rotary head cylinder or interfering with its rotation, and can realize a miniature, light magnetic recording/playback apparatus with high reliability.

Next, a third embodiment of the invention will be described with reference to the drawings.

Figure 10:
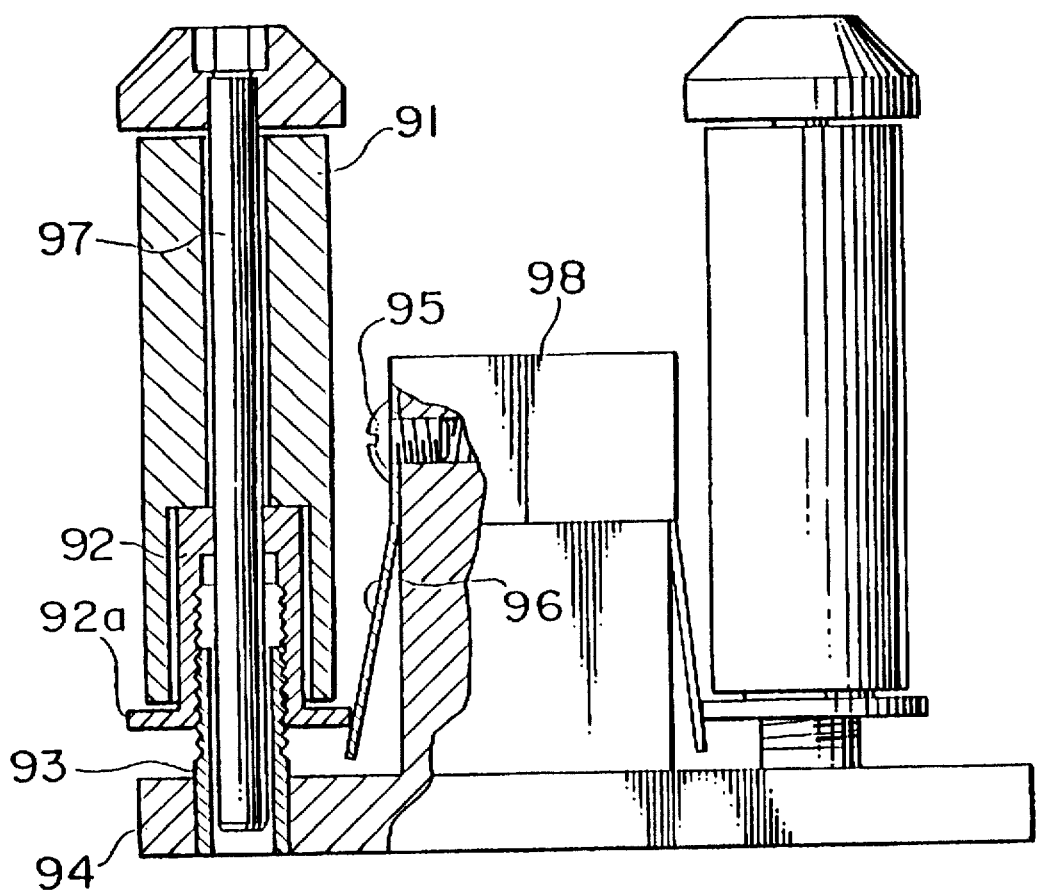
FIG. 10 is a view, partly cross-sectioned, of a loading post holding device according to a third embodiment of the invention.
Figure 11:
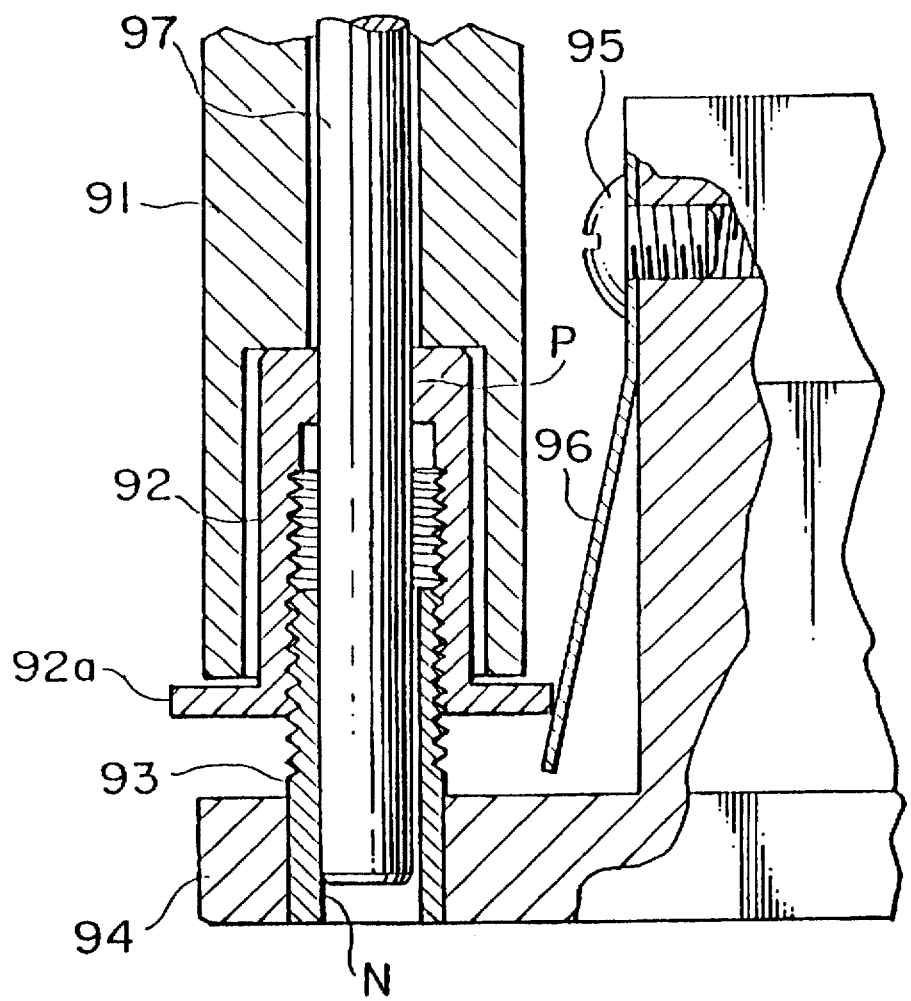
FIG. 11 is an enlarged view, partly cross-sectioned, of the loading post holding device of the third embodiment.

FIG. 10 is a view, partly cross-sectioned, of a loading post holding device according to the third embodiment of the present invention, and FIG. 11 is an enlarged view, partly cross-sectioned, of FIG. 10.

In FIGS. 10 and 11, denoted by 91 is a roller at the take-up side coming into contact with a magnetic tape (not shown) during an operation of loading the tape. The take-up side roller 91 receives a shaft 97 inserted therethrough and has a thinner wall in its lower portion. 92 denotes a roller holder member which has the upper end for holding the take-up side roller 91 in such a manner that it will not slip off downwards, and has the inner peripheral surface against which a shaft 97 is press-fitted. The roller holder tube 92 is formed at the lower end thereof with a flange 92a extending outwardly, and the inner peripheral surface of the tube 92 is threaded in its lower portion. 93 denotes a pipe of which an outer peripheral surface in its upper portion is screwed into the threaded portion of the roller holder tube 92, and of which a lower portion is fixedly press-fitted into a take-up side boat 94. Thus, the roller holder tube 92 is arranged such that its height can be changed to some extent by adjusting the screwed engagement between the tube 92 and the pipe 93. 94 denotes a take-up side boat receiving the pipe 93 fixedly press-fitted into one end portion thereof. A spring (urging member) 96 is fixed with a screw 95 to the lateral surface of a projection 98 formed at the center of the take-up side boat 94, the spring 96 pressing the inner edge of the flange 92 outwardly. Note that the right side of the boat 94 in FIG. 10 is arranged in a similar manner to the left side and thus will not be explained any more.

Figure 20:
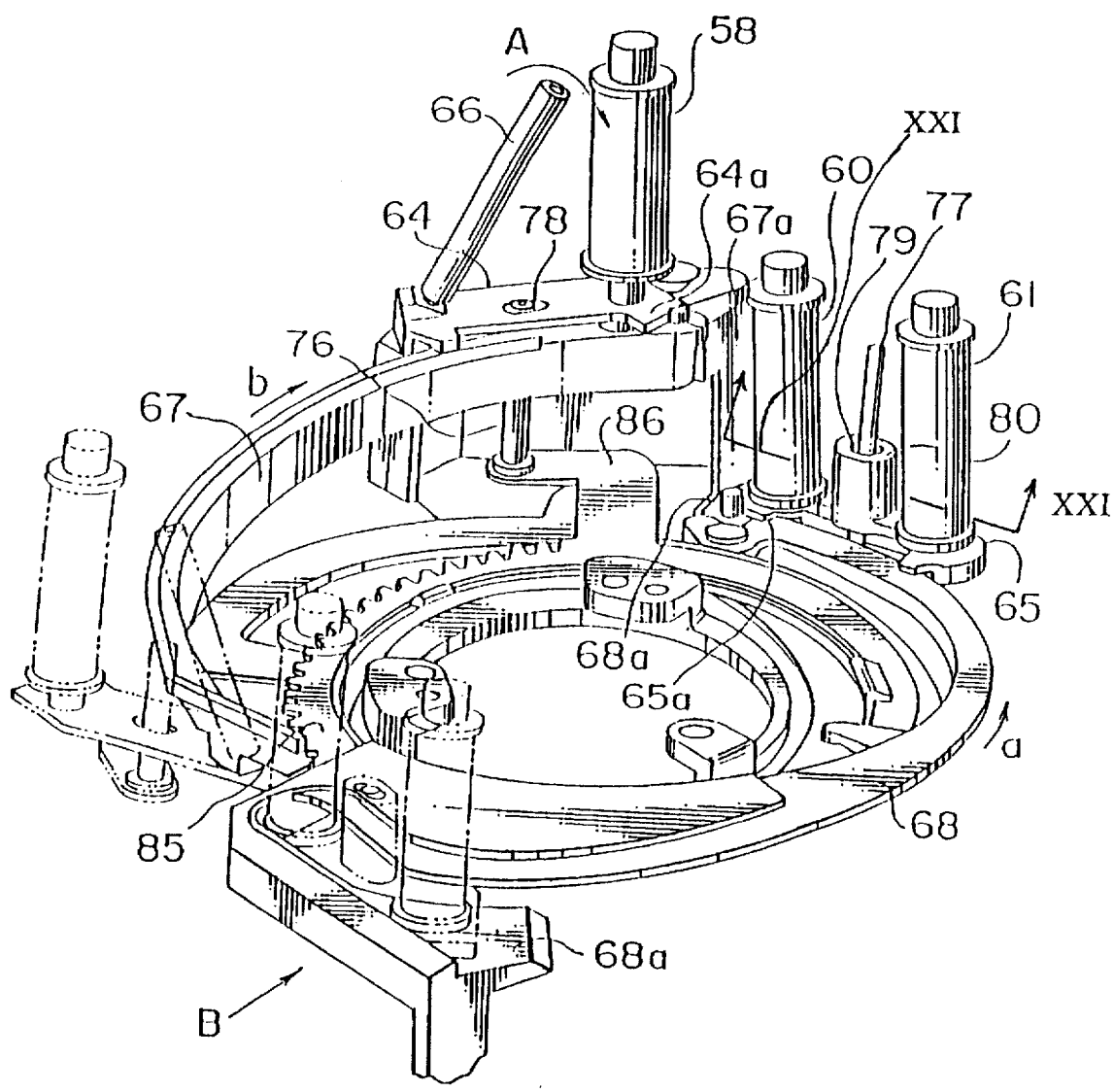
FIG. 20 is an enlarged perspective view showing principal parts of the loading post driving device in the prior art.
Figure 21:
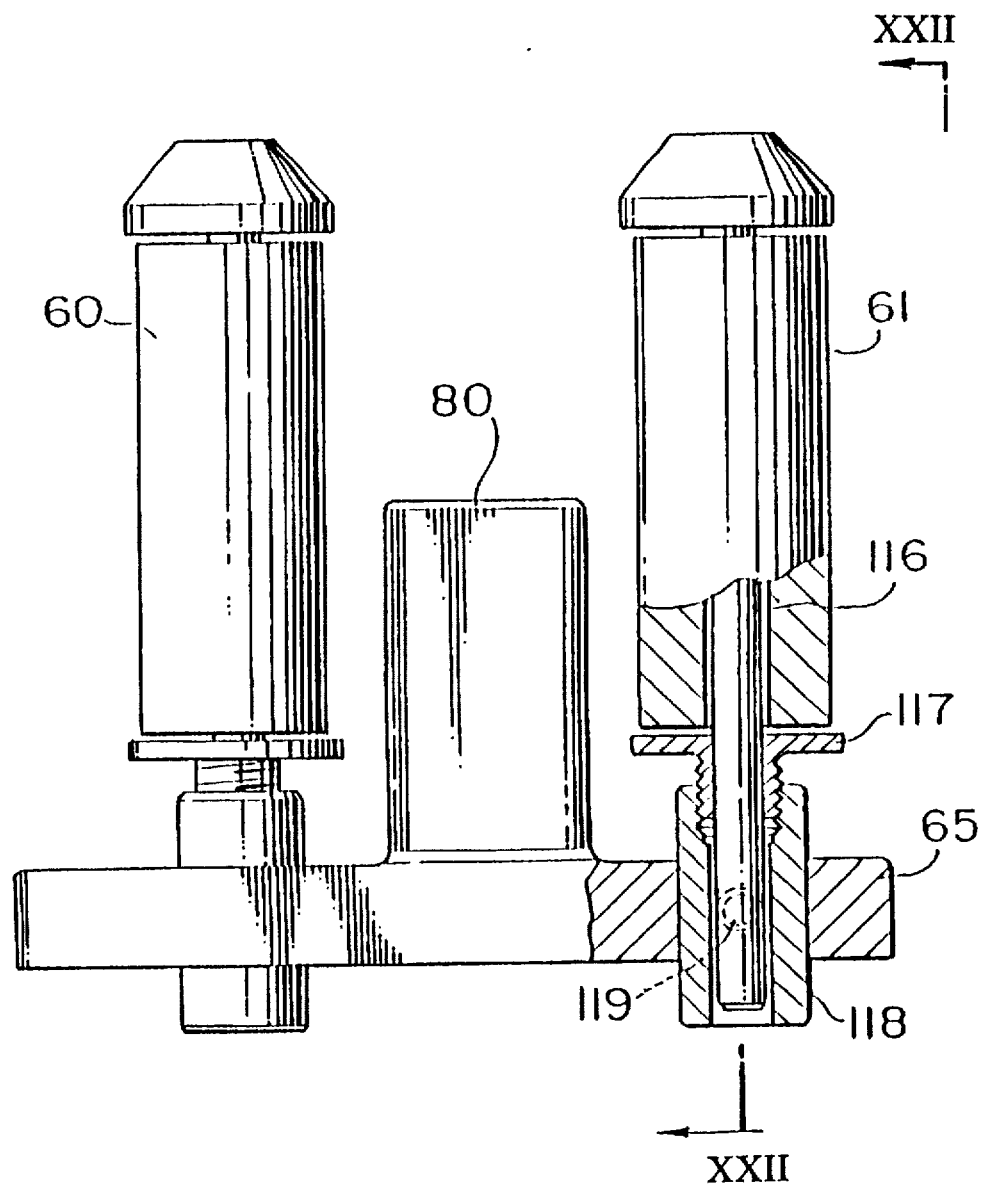
FIG. 21 is a view, partly cross-sectioned, as viewed in a direction of arrows XXI—XXI in FIG. 20.
Figure 22:
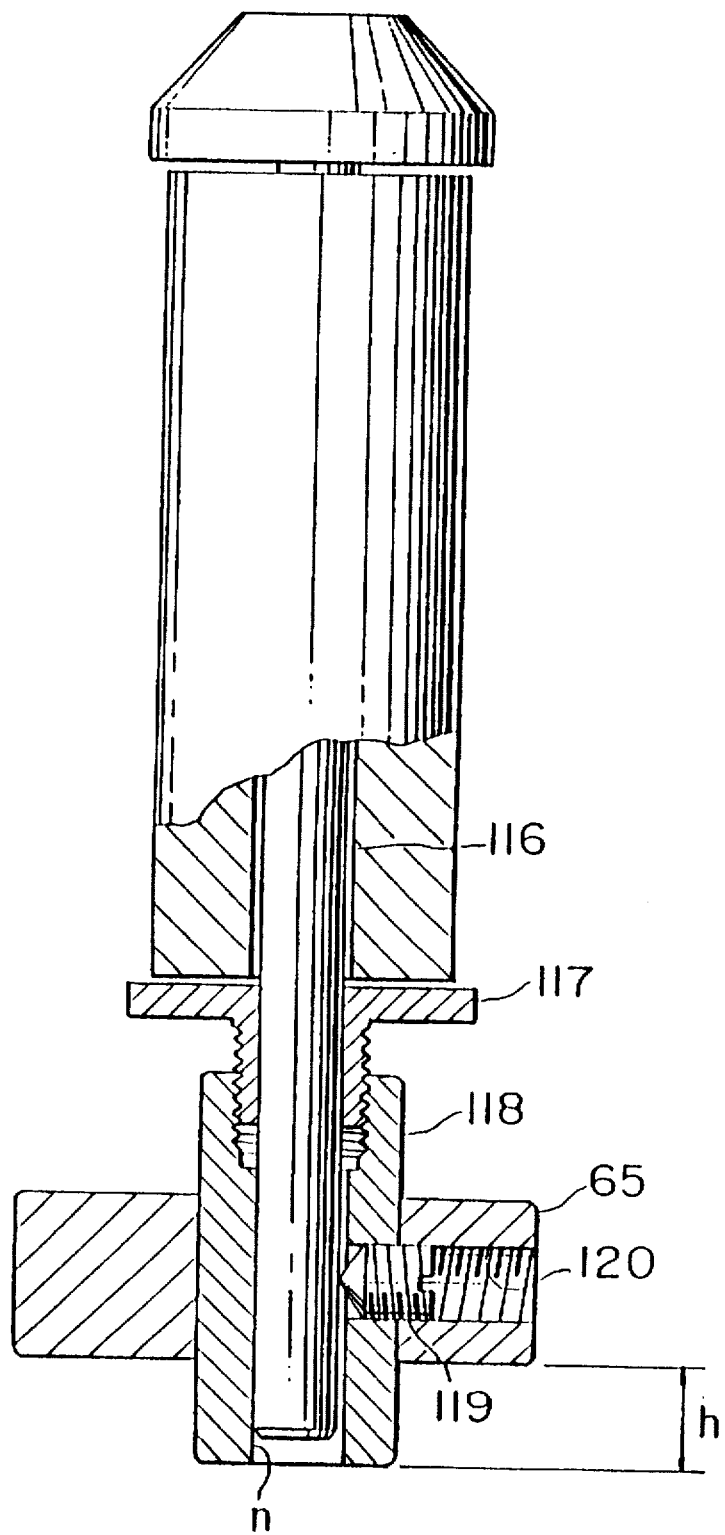
FIG. 22 is a view of a part of FIG. 21, partly cross-sectioned, as viewed in a direction of a line XXII—XXII in FIG. 21.
Figure 23:
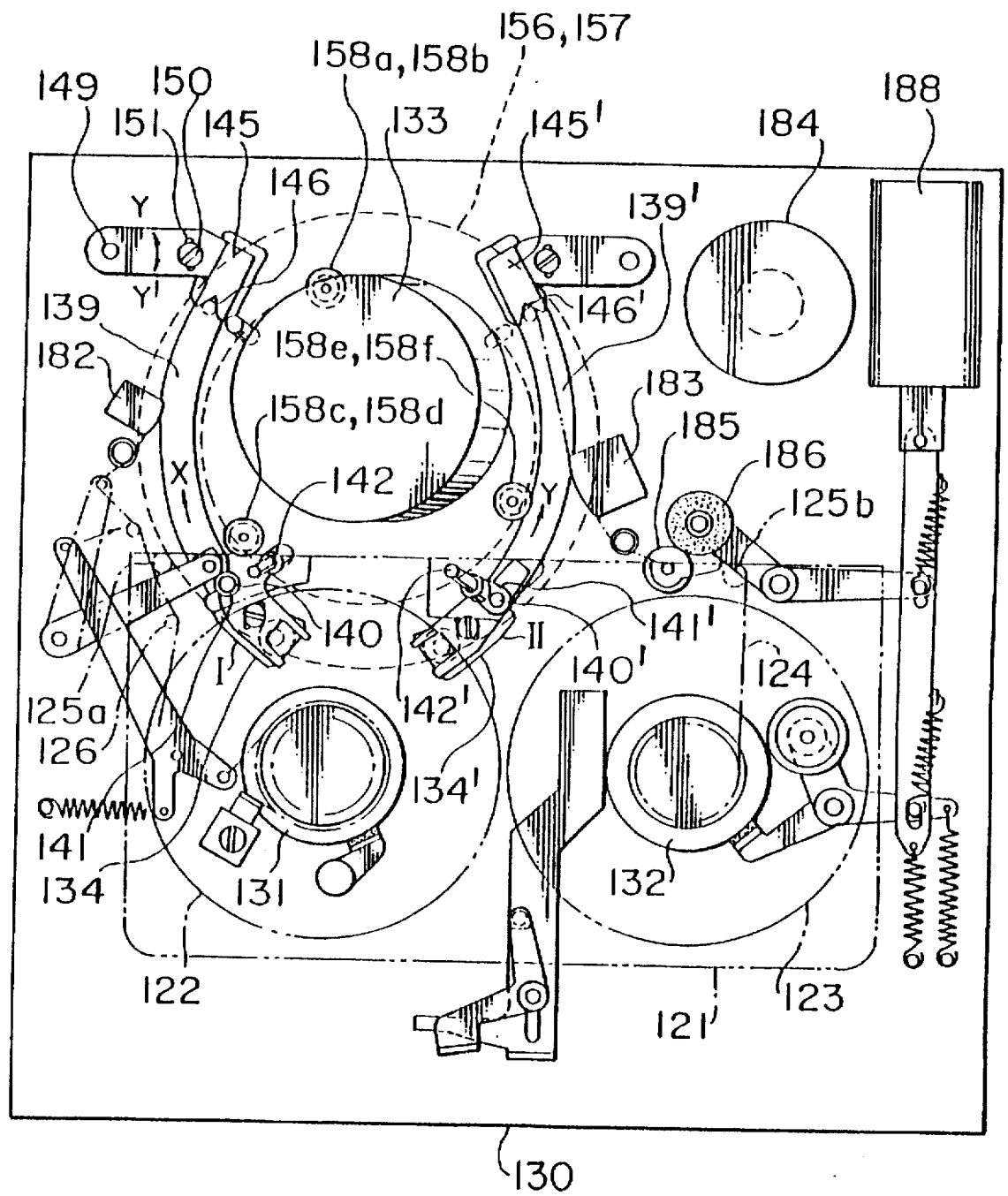
FIG. 23 is a top plan view of a magnetic recording/playback apparatus in the prior art.
Figure 24:
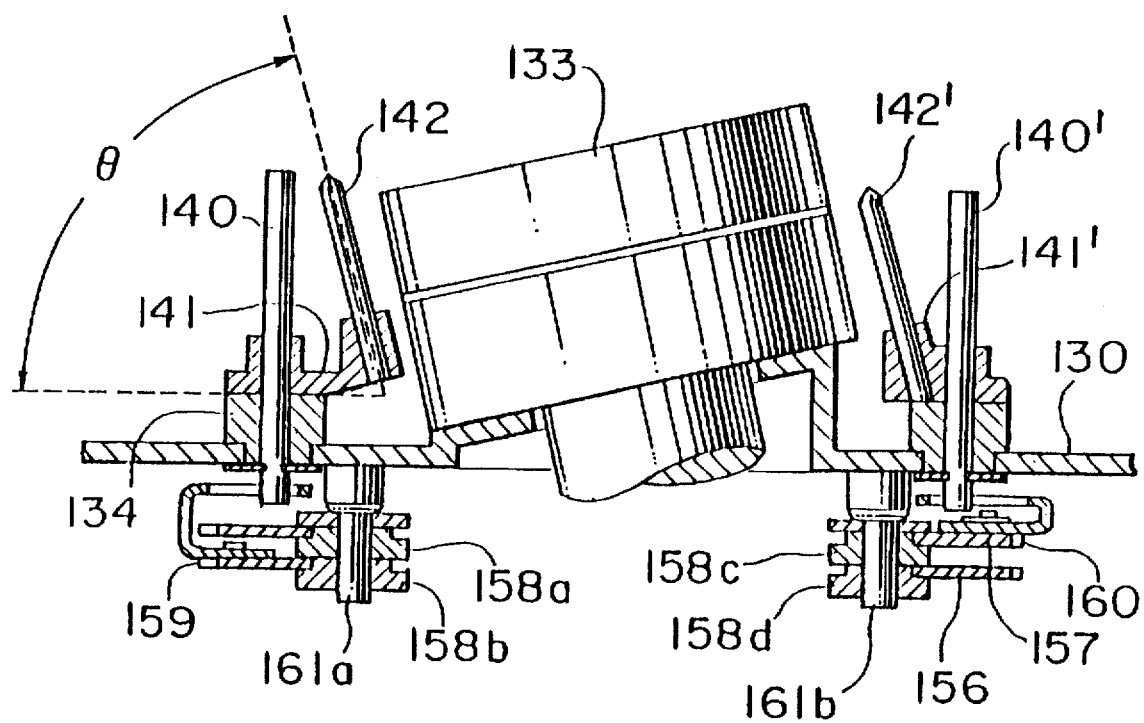
FIG. 24 is a cross-sectional view of a withdrawer unit I in the apparatus of FIG. 23.

The operation of the thus-arranged loading post holding device according to this embodiment of the present invention will now be described. Since the loading post holding device of this embodiment operates almost like the prior art device explained above by referring to FIG. 20, only the difference therebetween is given below.

At a loading start position (first position or home position), the take-up side boat 94 is on standby at the position indicated by phantom lines in FIG. 1. The take-up side boat 94 is moved by drive means (not shown) in a direction of an arrow a along the take-up side loading guide 68 (FIG. 20), followed by stopping at a loading terminal position (second position).

While the take-up side boat 94 in the loading post holding device is moving from the loading start position to the loading terminal position, the flange 92a is pressed by the spring 96 at all times as shown in FIG. 11. The force borne by the flange 92a in turn presses the shaft 97 against a reference surface N of the pipe 93 through a press-fitted portion P of the roller holder tube 92 against the shaft 97. Note that the screw-engagement relationship between the pipe 93 and the roller holder 92 is usually looser than the fitting relationship between the pipe 93 and the shaft 97. In this mean, FIG. 11 is not rather exact.

Further, although the height of the roller holder tube 92 can be controlled by adjusting the screwed engagement with the pipe 93 as stated above, the roller holder tube 92 is prevented from turning by the presence of the spring 96 in the course of driving between the first and second positions, because the flange 92a is always pressed by the spring 96.

As explained above, according to the third embodiment of the present invention, since the point of pressing the shaft 97 can be located at a so high level relative to the take-up side boat 94, the distance between the lower end surface of the roller 91 and the lower end surface of the pipe 93 can be made smaller. In addition, since it is unnecessary to insert a screw into the take-up side boat 94 from its lateral face, the take-up side boat 94 is only required to have a height great enough to hold the pipe 93 by press-fitting. This enables considerable reduction in the total height of the loading post holding device. As a result, by using the rolling post holder member of this embodiment in a magnetic recording/playback apparatus, it is possible to reduce the size in a direction of height and realize a smaller magnetic recording/playback apparatus.

Next, a loading post driving device according to a fourth embodiment of the present invention will be described with reference to FIGS. 12 to 14.

Figure 12:
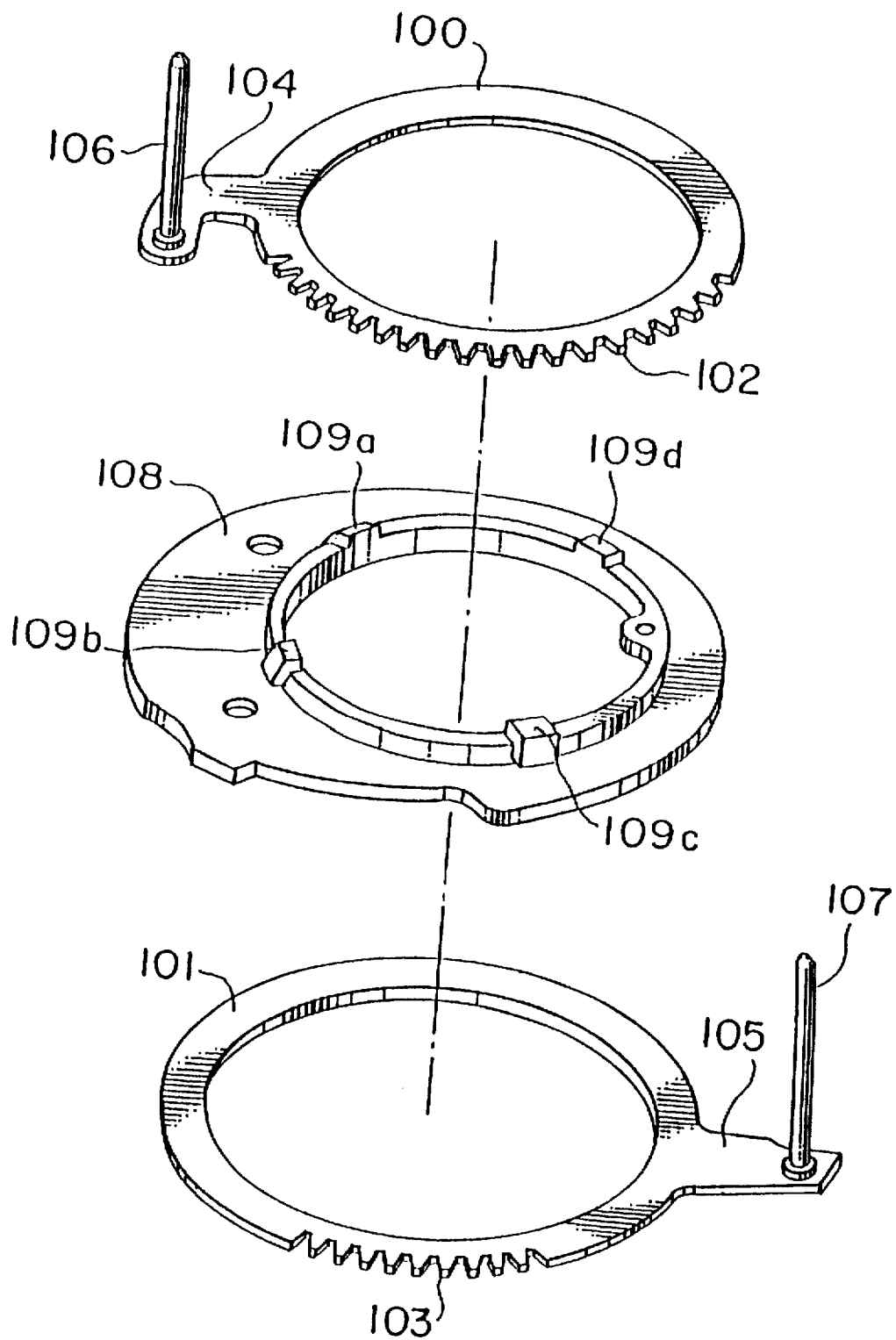
FIG. 12 is a perspective view of loading rings and a loading ring guide of a loading post driving device according to a fourth embodiment of the invention.

FIG. 12 is a perspective view of loading rings and a loading ring guide of the loading post driving device.

In FIG. 12, 100 denotes a loading ring at the supply side which has a teeth region 102 and a fixed arm 104 along the outer peripheral edge thereof, with a drive shaft 106 at the supply side mounted upwardly at the distal end of the fixed arm 104. 101 denotes a loading ring at the take-up side which has a diameter slightly larger than that of the supply side loading ring 100 and is arranged in a similar manner thereto. 108 denotes a loading ring guide which has a plurality of claws 109a, 109b, 109c and 109d arranged along the inner peripheral edge and is molded as one piece by using resin such as polyacetal.

Figure 13:
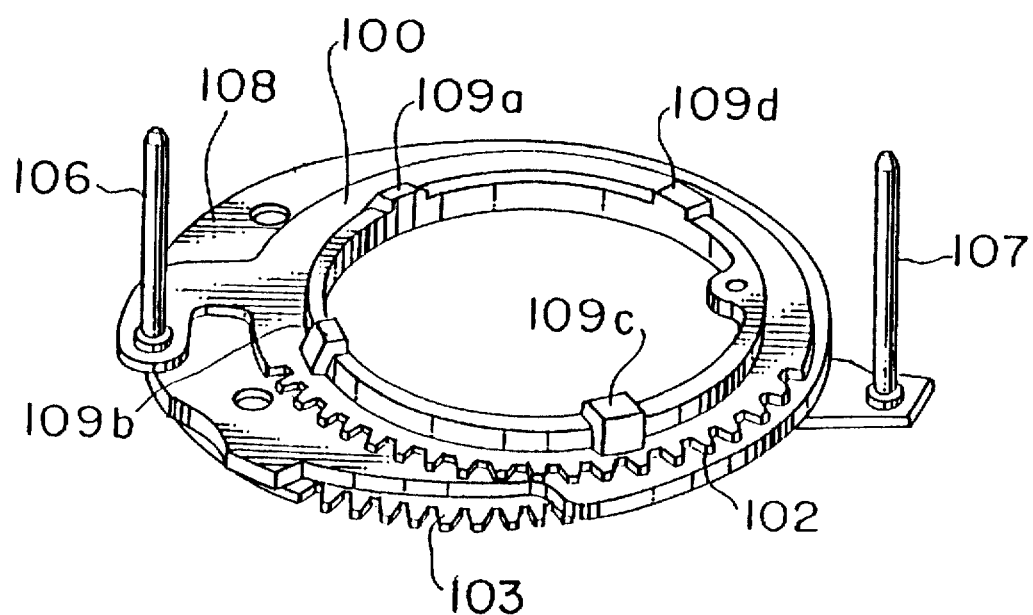
FIG. 13 is a perspective view showing an arrangement of the loading ring guide in the fourth embodiment.
Figure 14:
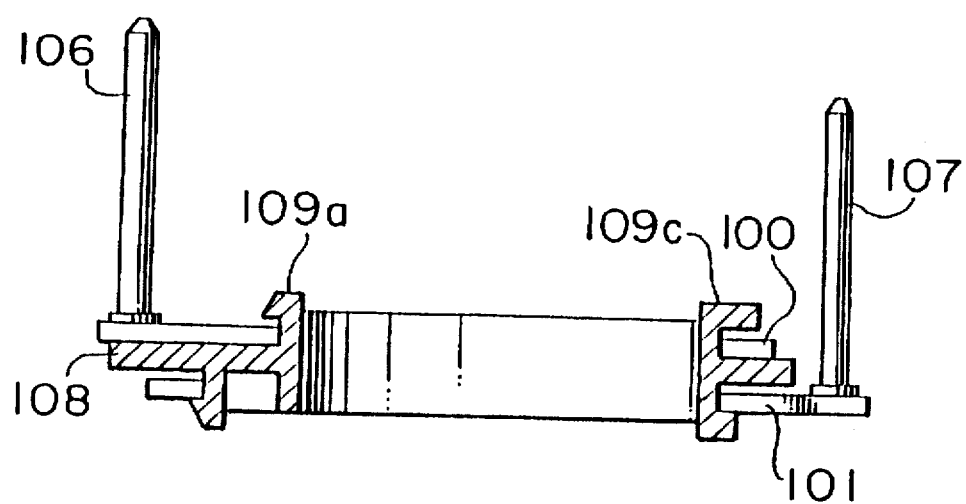
FIG. 14 is a cross-sectional view of the loading ring guide.
Figure 15:
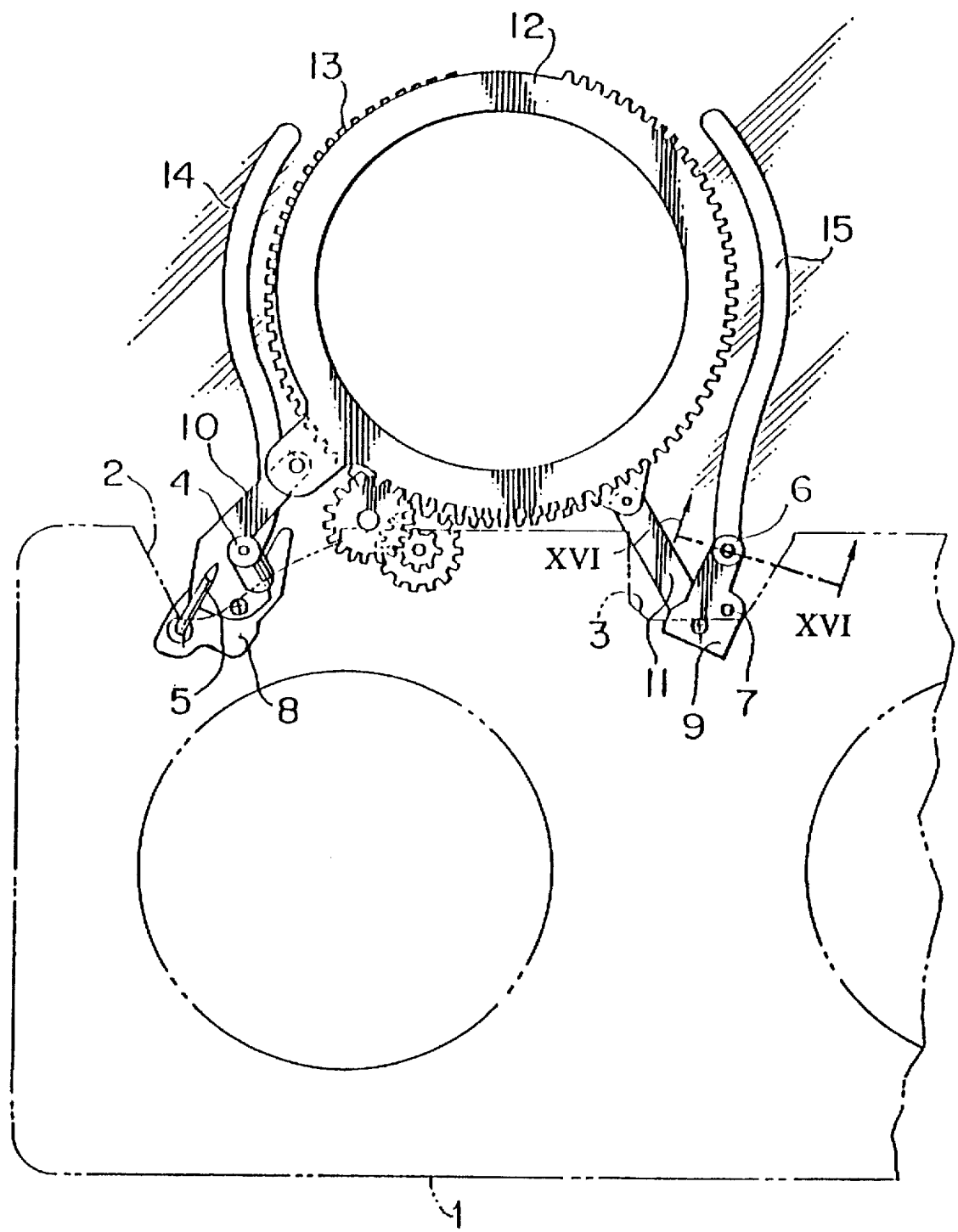
FIG. 15 is a top plan view of a loading post driving device in the prior art.
Figure 16:
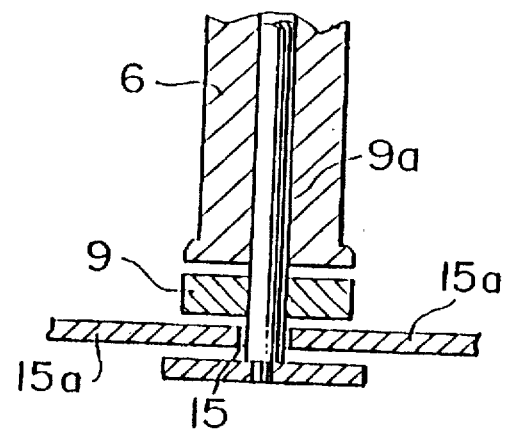
FIG. 16 is a cross-sectional view taken along a line XVI'XVI in FIG. 15.
Figure 17:
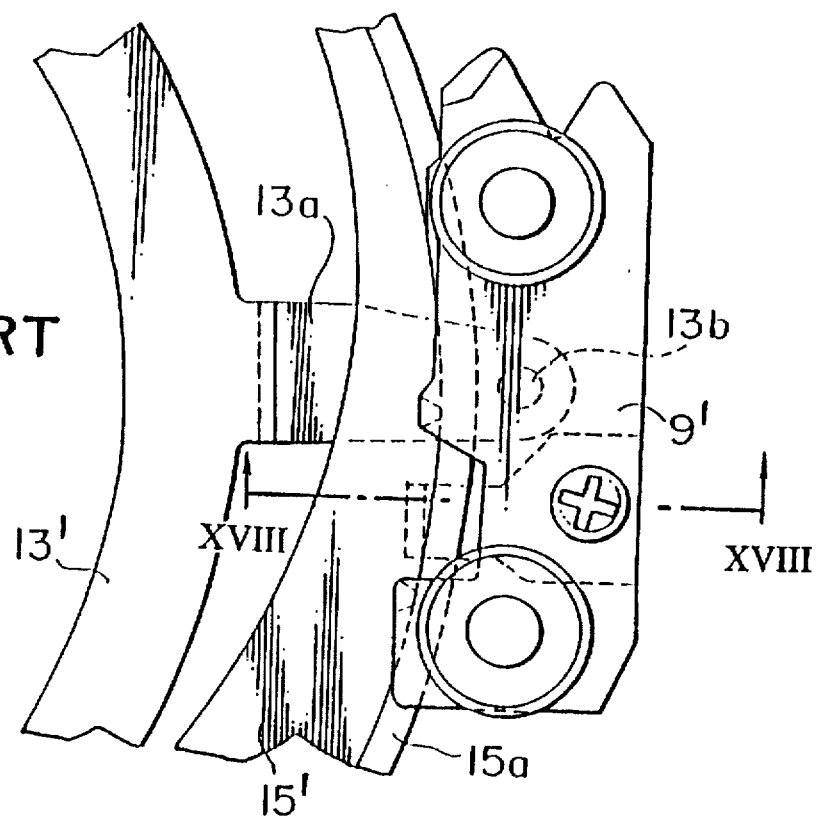
FIG. 17 is a top plan view showing another prior art device.

As shown in FIGS. 13 and 14, the loading rings 100 and 101 are fitted to the claws 109a, 109b, 109c and 109d of the loading ring guide 108 so that the loading rings 100 and 101 are integrated to the loading ring guide 108 in a turnable manner.

Of the claws 109a, 109b, 109c and 109d of the loading ring guide 108. Claws 109a and 109b have tapered portions, whereas claws 109c and 109d have no tapered portions and are formed to be somewhat larger than claws 109a and 109b.

With such an arrangement, the loading ring 100 can be assembled to the loading ring guide 108 by the simple steps of first fitting the loading ring 100 to the claws 109c and 109d of the loading ring guide 108, and then pushing the loading ring 100 from above the tapered portions of the claws 109a and 109b. After the assembling, the loading ring 100 will not disconnect from the loading ring guide 108 with the presence of the claws 109a, 109b, 109c and 109d.

The loading ring 101 can be assembled in a similar manner to the loading ring 100.

As described above, according to the fourth embodiment of the present invention, since a loading ring guide is fabricated by one-piece molding and the loading ring guide is provided with holders adapted to integrate loading rings and the loading ring guide in a turnable manner, the number of parts used can be reduced and the assembling efficiency can be improved.

What is claimed is:

1. A loading post driving device comprising:
    a chassis including a mechanism comprising first and second loading posts for drawing a magnetic tape out of a tape cassette and winding the magnetic tape around a rotary head cylinder having a rotary head installed therein;
    first and second loading rings, each having a teeth region along an outer periphery of said ring, and being rotatably drivable by a drive source to respectively drive said first and second loading posts;
    first and second connector means for respectively connecting said first and second loading posts and said first and second loading rings to each other; and
    a loading ring guide, mounted on said chassis and having an integral one-piece construction, for rotatably holding said first and second loading rings, said first and second loading rings being held only by said loading ring guide.

\* \* \* \* \*